United States Patent
Bonelli et al.

(10) Patent No.: US 9,303,940 B2
(45) Date of Patent: Apr. 5, 2016

(54) SYSTEMS, METHODS, AND APPARATUS FOR SUPPORTING A FIREARM

(71) Applicant: Keng's Firearms Specialty, Inc., Atlanta, GA (US)

(72) Inventors: David Ryan Bonelli, Smyrna, GA (US); William Edward Brown, Marietta, GA (US); Kio Antwii James, Austell, GA (US); Da Keng, Smyrna, GA (US); Alvin Christopher Williams, Smyrna, GA (US)

(73) Assignee: KENG'S FIREARMS SPECIALTY, INC., Atlanta, GA (US)

( * ) Notice: Subject to any disclaimer, the term of this patent is extended or adjusted under 35 U.S.C. 154(b) by 177 days.

(21) Appl. No.: 14/068,352

(22) Filed: Oct. 31, 2013

(65) Prior Publication Data
US 2014/0115940 A1  May 1, 2014

Related U.S. Application Data

(60) Provisional application No. 61/721,297, filed on Nov. 1, 2012.

(51) Int. Cl.
F16M 11/04 (2006.01)
F41A 23/10 (2006.01)
F16M 11/14 (2006.01)
F16M 11/38 (2006.01)

(52) U.S. Cl.
CPC .............. *F41A 23/10* (2013.01); *F16M 11/14* (2013.01); *F16M 11/38* (2013.01)

(58) Field of Classification Search
CPC ....... F16M 11/38; F16M 11/32; F16M 11/26; F16M 11/16; F16M 11/02; F16M 11/00; F16M 11/041; F16M 11/14; F16B 7/105; G03B 17/561
USPC .............. 248/168, 166, 188, 165, 169, 188.1, 248/188.2, 188.6, 188.8, 188.9, 176.1, 248/177.1, 178.1, 187.1, 183.2
See application file for complete search history.

(56) References Cited

U.S. PATENT DOCUMENTS

| | | | |
|---|---|---|---|
| 4,249,817 A * | 2/1981 | Blau | 396/428 |
| 5,711,103 A | 1/1998 | Keng | |
| 6,896,227 B2 * | 5/2005 | Ku | 248/170 |
| 7,077,582 B2 * | 7/2006 | Johnson | 396/428 |
| 7,111,424 B1 | 9/2006 | Moody et al. | |
| 7,207,534 B2 * | 4/2007 | Crain et al. | 248/188.8 |
| 7,523,904 B2 * | 4/2009 | Carnevali | 248/278.1 |
| 7,614,174 B1 | 11/2009 | Beltz | |

(Continued)

OTHER PUBLICATIONS

International Search Report for related International Application No. PCT/US2013/067735 mailed Feb. 7, 2014.

*Primary Examiner* — Nkeisha Smith
(74) *Attorney, Agent, or Firm* — Sutherland Asbill & Brennan LLP

(57) ABSTRACT

A firearm support is disclosed herein. The firearm support may include a main body assembly, at least two legs operably attached to the main body assembly, and a mounting assembly operably attached to the main body assembly. The mounting assembly may include an attachment mechanism operable to attach a firearm to the mounting assembly, a pan mechanism operable to control an angular rotation about a first axis of the mounting assembly, and a cant mechanism operable to control an angular rotation about a second axis of the mounting assembly.

19 Claims, 7 Drawing Sheets

(56) References Cited

U.S. PATENT DOCUMENTS

| | | |
|---|---|---|
| 7,631,455 B2 | 12/2009 | Keng et al. |
| 7,676,977 B1 | 3/2010 | Cahill et al. |
| 7,793,454 B1 | 9/2010 | Beltz |
| 8,267,361 B1 * | 9/2012 | Dordick ..................... 248/181.1 |
| 8,307,576 B1 * | 11/2012 | Bogart et al. ..................... 42/94 |
| 8,402,684 B1 | 3/2013 | Beltz |
| 8,418,973 B2 * | 4/2013 | Liu et al. ..................... 248/183.2 |
| 8,485,488 B2 * | 7/2013 | Forrest et al. ................. 248/408 |
| 8,596,892 B2 * | 12/2013 | Murrow et al. ............... 396/428 |
| 9,004,419 B2 * | 4/2015 | Nakatani ..................... 248/178.1 |
| 2002/0179786 A1 * | 12/2002 | Zheng ........................ 248/178.1 |
| 2006/0175482 A1 * | 8/2006 | Johnson ..................... 248/176.1 |
| 2006/0175483 A1 * | 8/2006 | Osaka ........................ 248/177.1 |
| 2008/0224000 A1 * | 9/2008 | Yang ........................... 248/188.5 |
| 2009/0101773 A1 * | 4/2009 | Yang ........................... 248/181.1 |
| 2010/0084524 A1 * | 4/2010 | Faifer ............................ 248/170 |
| 2011/0133043 A1 * | 6/2011 | Chang ........................ 248/188.9 |
| 2014/0175237 A1 * | 6/2014 | Higashi ...................... 248/188.5 |

* cited by examiner

SYSTEMS, METHODS, AND APPARATUS FOR SUPPORTING A FIREARM

CROSS-REFERENCE TO RELATED APPLICATION

The present application claims priority to and the benefit of U.S. Provisional Patent Application No. 61/721,297, filed Nov. 1, 2012, entitled "SYSTEMS, METHODS, AND APPARATUS FOR PROVIDING A FIREARM SUPPORT DEVICE," which is hereby incorporated by reference in its entirety.

FIELD OF THE DISCLOSURE

The disclosure generally relates to firearm accessories and more particularly relates to systems, methods, and apparatus for supporting a firearm.

BACKGROUND

When shooting firearms, especially in stressful situations, it can be important that the firearm be maintained in a relatively steady, stable position to ensure accuracy of a user or shooter's aim. In some instances, shooters may not be able to hold a firearm consistently in a set position without wavering, particularly after the onset of fatigue that can result from strain on the shooter due, in some instances, to the size and weight of the firearm. Conventional peripheral support devices have been used with firearms to stabilize a firearm to reduce vibration, wavering, etc., and to improve shooting accuracy. However, many conventional peripheral support devices can still be relatively unstable, and some may require the use of special mounting tools to associate the peripheral support device to the firearm. Other conventional peripheral support devices may be relatively difficult to attach and/or detach from an associated firearm. Yet other conventional peripheral support devices may require that relatively expensive modifications be made to an associated firearm, which may mar the finish of the firearm.

SUMMARY

Some or all of the above needs and/or problems may be addressed by certain embodiments of the firearm support disclosed herein. According to an embodiment, the firearm support may include a main body assembly, at least two legs operably attached to the main body assembly, and a mounting assembly operably attached to the main body assembly. The mounting assembly may include an attachment mechanism operable to attach a firearm to the mounting assembly, a pan mechanism operable to control an angular rotation about a first axis of the mounting assembly, and a cant mechanism operable to control an angular rotation about a second axis of the mounting assembly.

Other features and aspects of the firearm support will be apparent or will become apparent to one with skill in the art upon examination of the following figures and the detailed description. All other features and aspects, as well as other systems, methods, and assembly embodiments, are intended to be included within the description and are intended to be within the scope of the accompanying claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
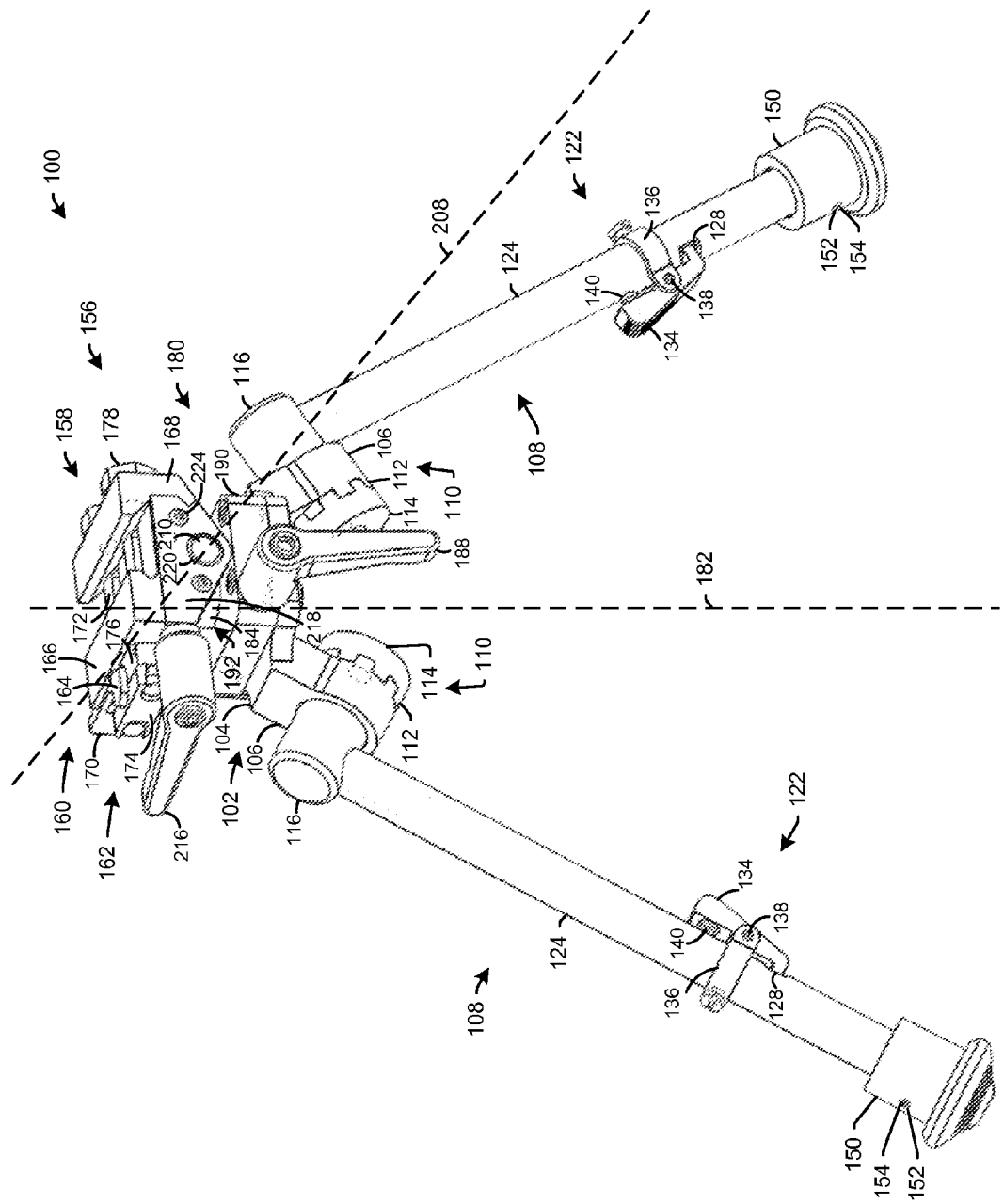
FIG. 1 schematically depicts a firearm support in accordance with one or more embodiments of the disclosure.
Figure 2:
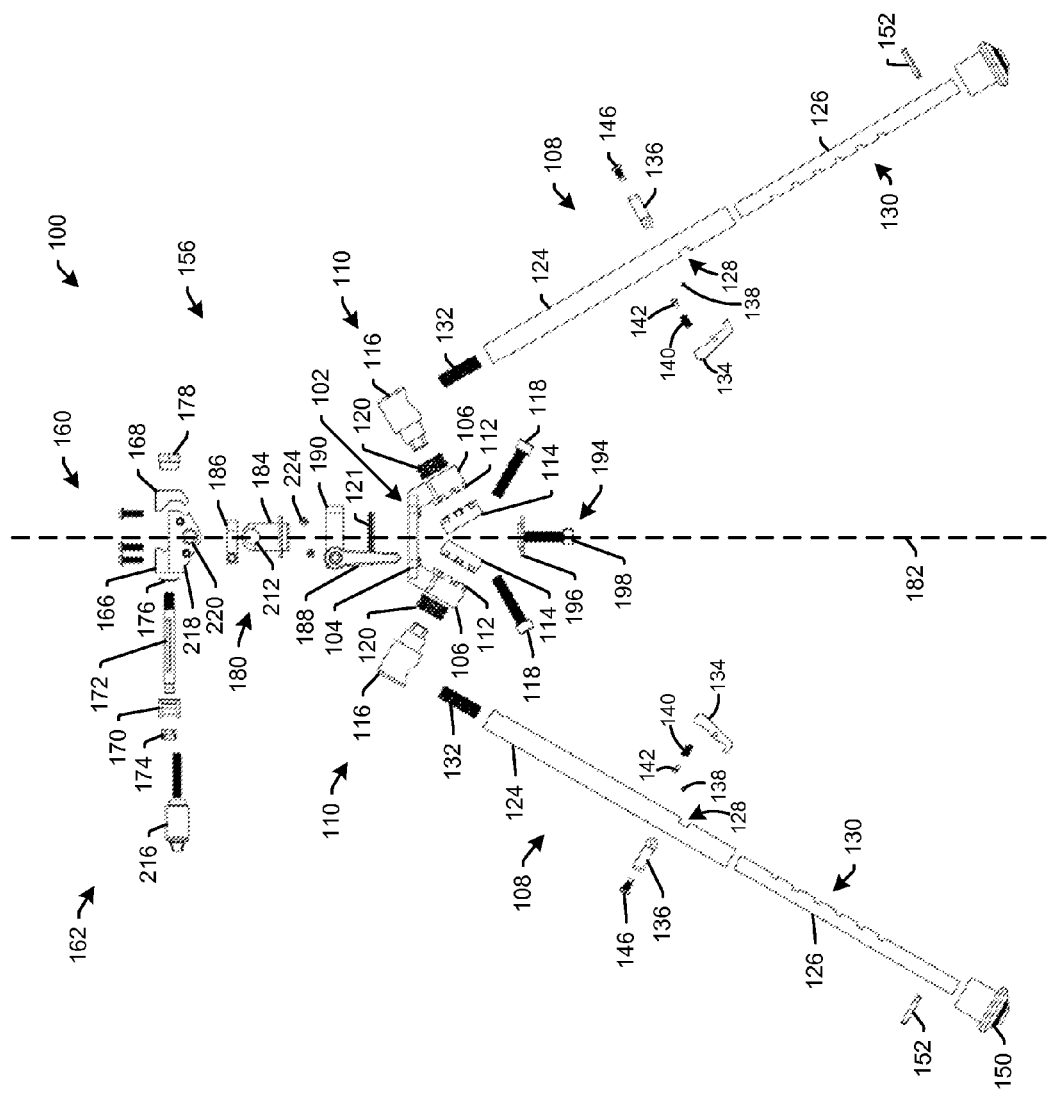
FIG. 2 schematically depicts a firearm support in accordance with one or more embodiments of the disclosure.
Figure 3:
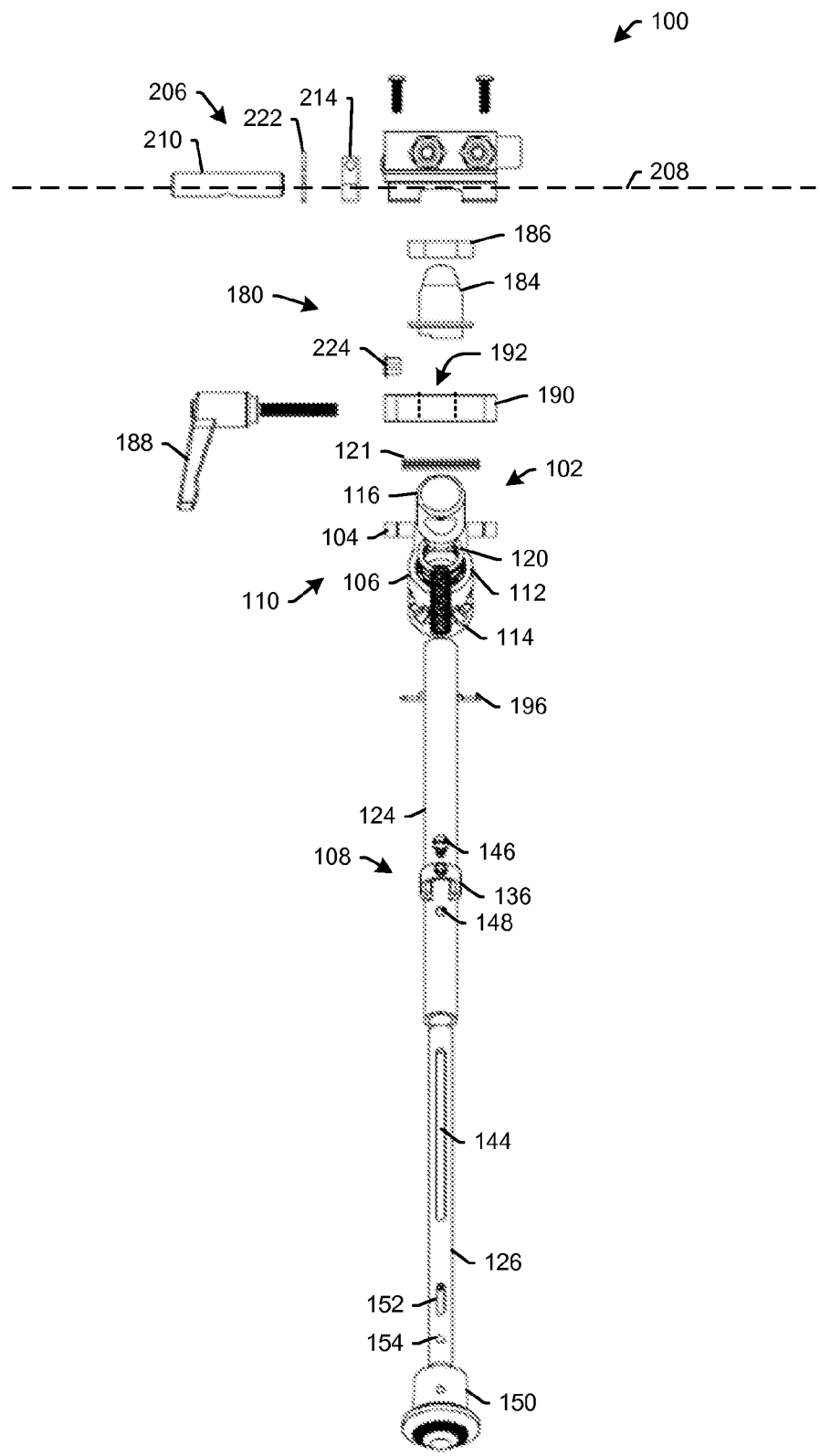
FIG. 3 schematically depicts a firearm support in accordance with one or more embodiments of the disclosure.

Described below are embodiments of a firearm support (as well as individual components of the firearm support) that can be attached to a firearm. In some instances, the firearm support may be a bipod. Methods of manufacturing, installing, and/or using the firearm support are also disclosed. The firearm may be a conventional firearm. For example, the firearm may be an M-16 style rifle, an AR-15 style rifle, an AR-10 style rifle, or an M-4 style rifle, among others. In some instances, the firearm may include a rail system, such as a Picatinny rail or the like. The firearm support may provide the technical effect and/or solution of improved control and stability, resulting in improved firearm accuracy and performance. Moreover, the firearm support may provide the technical effect and/or solution of improved maneuverability and/or configurability. Other technical effects and/or solutions may become apparent throughout the disclosure.

Generally speaking, the firearm support may include a main body assembly, at least two legs operably attached to the main body assembly, and a mounting assembly operably attached to the main body assembly. In some instances, the mounting assembly may include an attachment mechanism operable to attach a firearm to the mounting assembly, a pan mechanism operable to control an angular rotation about a first axis of the mounting assembly, and a cant mechanism operable to control an angular rotation about a second axis of the mounting assembly.

The pan mechanism may include a pan axle rotatably coupled to the main body assembly. In some instances, a pan friction lock may be at least partially disposed about the pan axle. The pan friction lock may include a pan locked position and a pan unlocked position. For example, a pan lever may be operable to move the pan friction lock between the pan locked position and the pan unlocked position. When the pan friction lock is in the pan locked position, the pan friction lock may clamp down on the pan axle and prevent the pan axle from rotating about the first axis. When the pan friction lock is in the pan unlocked position, the pan friction lock may be loosened about the pan axle and allow the pan axle to rotate about the first axis. The pan mechanism also may include a pan friction lock housing having a pan axle aperture therethrough. In some instances, the pan axle may be at least partially disposed within the pan axle aperture, and the pan friction lock may be at least partially disposed within the pan friction lock housing.

In certain embodiments, a pan limiter assembly may be configured to limit the angular rotation of the pan axle about the first axis. For example, the pan limiter assembly may include a pan limiter plate attached to the pan axle and at least one pan limiter catch attached to the main body assembly. In this manner, the pan limiter catch may catch (or prevent) the pan limiter plate from rotating beyond a set angular limit.

The cant mechanism may include a cant axle rotatably coupled to the pan axle. The cant axle and the pan axle may collectively form a universal joint. In some instances, a cant friction lock may be at least partially disposed about the cant axle. The cant friction lock may include a cant locked position and a cant unlocked position. A cant lever may be operable to move the cant friction lock between the cant locked position and the cant unlocked position. When the cant friction lock is in the cant locked position, the cant friction lock may clamp down on the cant axle and prevent the cant axle from rotating about the second axis. When the cant friction lock is in the cant unlocked position, the cant friction lock may be loosened about the cant axle and allow the cant axle to rotate about the second axis. The cant mechanism also may include a cant friction lock housing having a cant axle aperture therethrough. In some instances, the cant axle may be at least partially disposed within the cant axle aperture, and the cant friction lock may be at least partially disposed within the cant friction lock housing.

The legs may be operably attached to the main body assembly by an indexer assembly. The indexer assembly may be configured to control an angular rotation of the legs relative to the main body assembly. For example, each leg may be attached by an indexer assembly comprising a first circumferential array of indexes disposed about the main body assembly, a second circumferential array of indexes operably attached to one of the legs, and an indexer spring having a first position and a second position. In this manner, the first circumferential array of indexes and the second circumferential array of indexes may be operable to mate in a locked configuration when the indexer spring is in the first position. In contrast, the first circumferential array of indexes and the second circumferential array of indexes may be operable to rotate about each other when the indexer spring is in the second position. In some instances, the indexer spring may bias the indexer assembly in the locked configuration.

Each of the legs may include a telescoping assembly. That is, each leg may be operable to extend and retract. The telescoping assembly may include an outer leg and an inner leg. The outer leg may include a slot, and the inner leg may include a plurality of notches. The inner leg may be at least partially disposed within the outer leg. In this manner, the inner leg may be operable to extend and retract relative to the outer leg. A telescoping spring may be disposed within the outer leg and include a first position and a second position. A latch may be operably attached to the outer leg and include a locked position and an unlocked position. For example, a latch spring may be disposed between the latch and the outer leg to bias the latch in the locked position. In this manner, the latch may be operable to at least partially extend within the slot of the outer leg to mate with at least one of the notches when in the locked position. When the latch is in the unlocked position, the telescoping spring may force the inner leg to extend relative to the outer leg. The legs also may include a support foot attached to the inner leg.

The attachment mechanism may include a clamp assembly comprising a clamped position and an unclamped position. An attachment lever assembly may be operable to move the clamp assembly between the clamped position and the unclamped position by way of a cam-type mechanism. For example, the clamp assembly may include a fixed clamp and a moveable clamp. The moveable clamp may be operable to move relative to the fixed clamp between the clamped position and the unclamped position. The lever assembly may include an attachment lever disposed opposite the moveable clamp. At least one coupling rod may couple the attachment lever and the moveable clamp. In this manner, movement of the attachment lever moves the moveable clamp.

A clamping force of the clamp assembly may be adjusted by increasing or decreasing a distance between the fixed clamp and the moveable clamp along the coupling rod. In some instances, the coupling rod may be configured to at least partially protrude between at least two mounting projections on a rail assembly of a firearm. In some instances, the clamp assembly may at least partially comprise a silhouette that corresponds to a profile of a rail assembly of a firearm.

These and other embodiments of the disclosure will be described in more detail through reference to the accompanying drawings in the detailed description of the disclosure that follows. This brief introduction, including section titles and corresponding summaries, is provided for the reader's convenience and is not intended to limit the scope of the claims or the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Embodiments

FIGS. 1-6 schematically depict a firearm support 100 (as well as individual components of the firearm support 100) that can be attached to a firearm in accordance with one or more embodiments of the disclosure. The firearm may be a conventional firearm. By way of example, the firearm may be any number of firearms, such as, but not limited to, an M-16 style rifle, an AR-15 style rifle, an AR-10 style rifle, an M-4 style rifle, or the like. Moreover, the firearm may be a handgun or the like. In some instances, the firearm may include a rail system. The rail system may be configured to attach a number of accessories to the firearm, such as the firearm support 100. For example, the rail system may be a Picatinny rail or the like. Other rail systems may be used.

In certain embodiments, the firearm support 100 may include a main body assembly 102. In some instances, the main body assembly 102 may include a platform 104 having projections 106 extending therefrom at an angle. A pair of legs 108 may be operably attached to the main body assembly 102 at the projections 106. The legs 108 may be rotatable relative to the projections 106.

In certain embodiment, the legs 108 may be operably attached to the main body assembly 102 by an indexer assembly 110. That is, each leg 108 may include an indexer assembly 110. The indexer assembly 110 may be configured to control an angular rotation of the legs 108 relative to the main body assembly 102. For example, the main body assembly 102 may include a first circumferential array of indexes 112 disposed about the projections 106. The first circumferential array of indexes 112 may comprise a number of alternating protrusions and gaps arranged in a circular array. In addition, a second circumferential array of indexes 114 may be operably attached to the legs 108. For example, the second circumferential array of indexes 114 may be attached to the legs 108 by way of a leg adapter 116 and a socket head cap screw 118. The second circumferential array of indexes 114 may comprise a number of alternating protrusions and gaps arranged in a circular array similar to the first circumferential array of indexes 112. In this manner, the first circumferential array of indexes 112 and the second circumferential array of indexes 114 may be operable to engage each other in a locked configuration. For example, the protrusions may nest in the gaps in the locked configuration.

Figure 4:
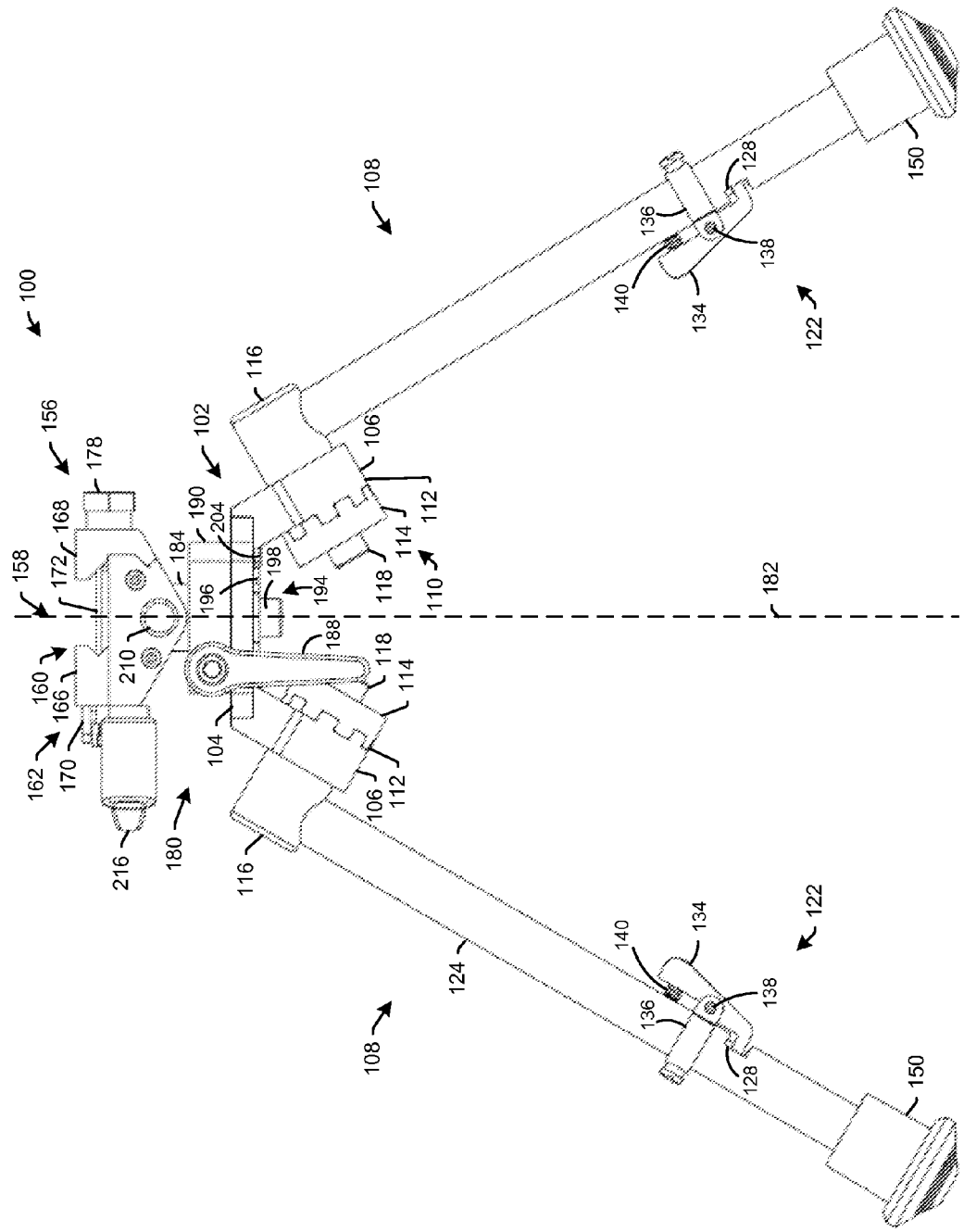
FIG. 4 schematically depicts a firearm support in accordance with one or more embodiments of the disclosure.
Figure 5:
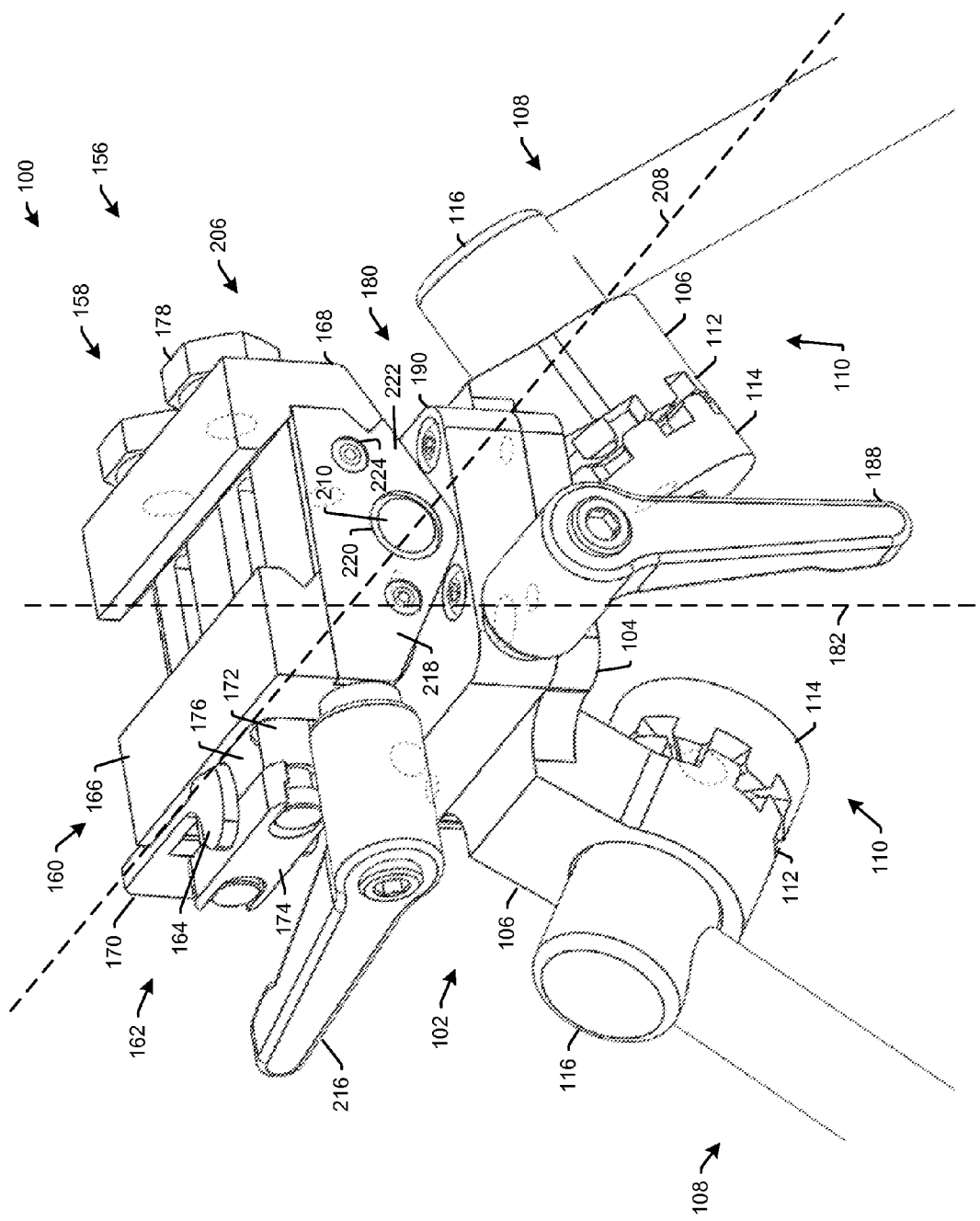
FIG. 5 schematically depicts a firearm support in accordance with one or more embodiments of the disclosure.
Figure 6:
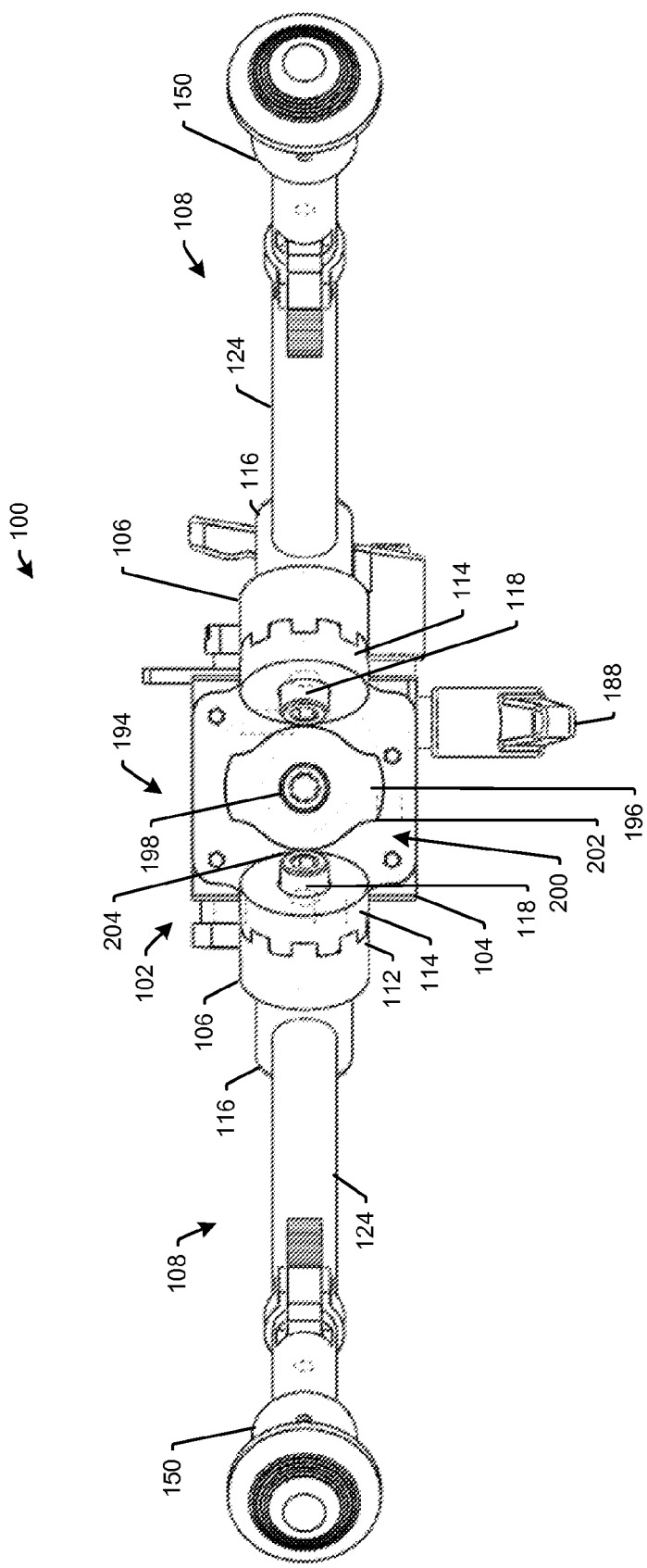
FIG. 6 schematically depicts a firearm support in accordance with one or more embodiments of the disclosure.

In an example embodiment, an indexer spring 120 may be positioned between the first circumferential array of indexes 112 and the leg adapter 116 so as to bias the indexer assembly 110 in the locked configuration. For example, the indexer spring 120 may include a first position and a second position. As depicted in FIG. 4, when the indexer spring 120 is in the first position (e.g., the bias position), the first circumferential array of indexes 112 and the second circumferential array of indexes 114 may be operable to mate in the locked configuration. As depicted in FIG. 5, when the indexer spring 120 is in the second position (e.g., compressed from the bias position), the first circumferential array of indexes 112 and the second circumferential array of indexes 114 may disengage each other, enabling the legs 108 to rotate.

In certain embodiments, the legs 108 may include a telescoping assembly 122. That is, each leg 108 may be operable to extend and retract. For example, the telescoping assembly 122 may include an outer leg 124 and an inner leg 126. In some instances, the outer leg 124 may be attached to the leg adapter 116. The inner leg 126 may be at least partially disposed within the outer leg 124. The inner leg 126 may be operable to extend and retract relative to the outer leg 124. The outer leg 124 may include a slot 128, and the inner leg 126 may include a plurality of notches 130 aligned with the slot 128.

A telescoping spring 132 may be disposed within the outer leg 124 between the inner leg 126 and the leg adapter 116. The telescoping spring 132 may tend to force the inner leg 126 to extend relative to the outer leg 124. A latch 134 may be operably attached to the outer leg 124. For example, the latch 134 may be attached to the outer leg 124 by a latch bracket 136 and a pin 138. In this manner, the latch 134 may pivot about the pin 138 between a locked position and an unlocked position. For example, a latch spring 140 may be disposed between the latch 134 and the outer leg 124 to bias the latch 134 in the locked position. In some instances, the latch spring 140 may be supported by a latch spring peg 142. A portion of the latch 134 may be operable to at least partially extend within the slot 128 of the outer leg 124 to engage at least one of the notches 130 when in the locked position. When the latch 134 is in the unlocked position (e.g., when the latch spring 140 is compressed), the telescoping spring 132 may force the inner leg 126 to extend relative to the outer leg 124.

The inner leg 126 may include a catch channel 144. In some instances, a catch screw 146 may extend through the latch bracket 136 and the outer leg 124 (via an aperture 148) and engage the catch channel 144. The catch channel 144 and the catch screw 146 may collectively prevent the inner leg 126 from extending beyond the outer leg 124. In some instances, when the catch screw 146 is removed, the inner leg 126 may be removed from the outer leg 124.

In certain embodiments, a support foot 150 may be attached to the inner leg 126. In some instances, the support foot 150 may be a rubber foot or the like. The support foot 150 may be attached to the inner leg 126 by a pin 152 and an aperture 154.

A mounting assembly 156 may be operably attached to the main body assembly 102 at the platform 104. In some instances, the mounting assembly 156 may include an attachment mechanism 158 operable to attach a firearm to the mounting assembly 156. The attachment mechanism 158 may include a clamp assembly 160 comprising a clamped position and an unclamped position. An attachment lever assembly 162 may be operable to move the clamp assembly 160 between the clamped position and the unclamped position by way of a cam-type mechanism 164. For example, the clamp assembly 160 may include a fixed clamp 166 and a moveable clamp 168. The moveable clamp 168 may be operable to move relative to the fixed clamp 166 between the clamped position and the unclamped position. The attachment lever assembly 162 may include an attachment lever 170 disposed opposite the moveable clamp 168. At least one coupling rod 172 may couple the attachment lever 170 and the moveable clamp 168. In this manner, movement of the attachment lever 170 may rotate the cam-type mechanism 164, which may move the moveable clamp 168 via the coupling rod 172. In some instances, an attachment bracket 174 may couple multiple coupling rods 172. In other instances, a rub plate 176 may be positioned about the coupling rod 172 between the cam-type mechanism 164 and the fixed clamp 166.

A clamping force of the clamp assembly 160 may be adjusted by increasing or decreasing a distance between the fixed clamp 166 and the moveable clamp 168 along the coupling rod 172. For example, a coupling nut 178 may be tightened or loosened along the coupling rod 172 to draw the moveable clamp 168 closer to the fixed clamp 166. In some instances, the coupling rod 172 may be configured to at least partially protrude between at least two mounting projections on a rail assembly of a firearm. In some instances, the clamp assembly 160 may at least partially comprise a silhouette that corresponds to a profile of a rail assembly of a firearm.

The mounting assembly 156 also may include a pan mechanism 180 operable to control an angular rotation about a first axis 182 of the mounting assembly 156. The pan mechanism 180 may include a pan axle 184 rotatably coupled to the main body assembly 102. In some instances, a pan friction lock 186 may be at least partially disposed about the pan axle 184. The pan friction lock 186 may include a pan locked position and a pan unlocked position. For example, a pan lever 188 may be operable to move the pan friction lock 186 between the pan locked position and the pan unlocked position. When the pan friction lock 186 is in the pan locked position, the pan friction lock 186 may be tightened so as to clamp down on the pan axle 184 and prevent the pan axle 184 from rotating about the first axis 182. When the pan friction lock 186 is in the pan unlocked position, the pan friction lock 186 may be loosened about the pan axle 184, allowing the pan axle 184 to rotate about the first axis 182. In some instances, the pan mechanism 180 may include a roller/needle bearing 121 to facilitated rotation of the pan axle 184. For example, the roller/needle bearing 121 may be positioned about the pan axle 184 within the platform 104. In some instances, the roller/needle bearing 121 may be a circular disc structure with one or more rollers. The pan mechanism 180 also may include a pan friction lock housing 190 having a pan axle aperture 192 therethrough. In some instances, the pan axle 184 may be at least partially disposed within the pan axle aperture 192, and the pan friction lock 186 may be at least partially disposed within the pan friction lock housing 190.

In certain embodiments, a pan limiter assembly 194 may be configured to limit the angular rotation of the pan axle 184 about the first axis 182. For example, the pan limiter assembly 194 may include a pan limiter plate 196 attached to the pan axle 184 by a cap screw 198. The pan limiter plate 196 may include a groove 200 and lip 202. The main body assembly 102 may include at least one corresponding pan limiter catch 204. The pan limiter catch 204 may extend into the groove 200 and mate with the lip 202 to prevent the pan limiter plate 196 (and thereby the pan axle 184) from rotating beyond a set angular limit.

The mounting assembly 156 may include a cant mechanism 206 operable to control an angular rotation about a second axis 208 of the mounting assembly 156. The cant mechanism 206 may include a cant axle 210 rotatably coupled to the pan axle 184. For example, the cant axle 210 may be at least partially disposed within an aperture 212 of the pan axle 184. In this manner, the cant axle 210 and the pan axle 184 may collectively form a universal joint.

In some instances, a cant friction lock 214 may be at least partially disposed about the cant axle 210. The cant friction lock 214 may include a cant locked position and a cant unlocked position. A cant lever 216 may be operable to move the cant friction lock 214 between the cant locked position and the cant unlocked position. When the cant friction lock 214 is in the cant locked position, the cant friction lock 214 may be tightened so as to clamp down on the cant axle 210 and prevent the cant axle 210 from rotating about the second axis 208. When the cant friction lock 214 is in the cant unlocked position, the cant friction lock 214 may be loosened about the cant axle 210 and allow the cant axle 210 to rotate about the second axis 208.

The cant mechanism 206 also may include a cant friction lock housing 218 having a cant axle aperture 220 therethrough. In some instances, the cant axle 210 may be at least partially disposed within the cant axle aperture 220, and the cant friction lock 214 may be at least partially disposed within the cant friction lock housing 218. In certain embodiments, a cant cover plate 222 may be attached to the cant friction lock housing 218 by one or more fasteners 224.

Illustrative Methods

Figure 7:
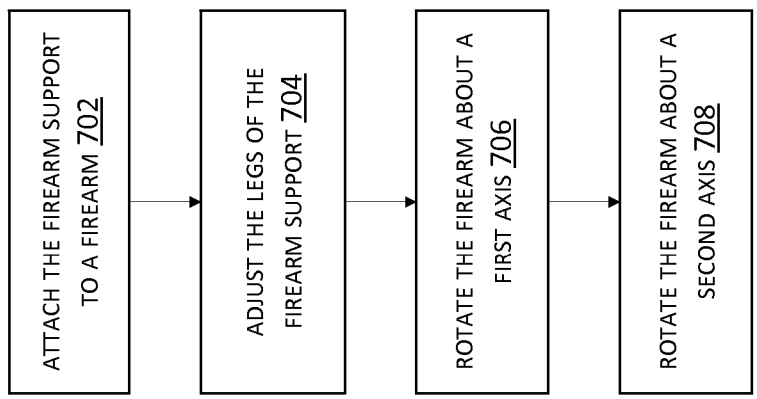
FIG. 7 is a flow diagram depicting an illustrative method for attaching a firearm support in accordance with one or more embodiments of the disclosure.

FIG. 7 is a flow diagram depicting an illustrative method 700 for attaching and operating the firearm support 100 shown in FIGS. 1-6 in accordance with one or more embodiments of the disclosure. In certain embodiments, the firearm support 100 enables a user to quickly attach and arrange the firearm support 100 in a number of configurations generally without the use of a separate tool.

At block 702 of the method 700, the firearm support 100 may be attached to a firearm. For example, the firearm support 100 may include an attachment mechanism 158 operable to attach a firearm to a rail assembly associated with the firearm. In some instances, the rail assembly may be a Picatinny rail. Once the firearm support 100 has been attached to the firearm at block 702, the legs 108 of the firearm support 100 may be adjusted at block 704 of the method 700. For example, the legs 108 may be attached to the firearm support 100 by way of an indexer assembly 110. In this manner, the legs 108 may be rotated and locked into position using the indexer assembly 110. In addition, the length of the legs 108 may be adjusted by way of the telescoping assembly 122. For example, the legs 108 may be extended or retracted.

The firearm may be rotated about a first axis 182 using the pan mechanism 180 at block 706 of the method 700. For example, the pan lever 188 may be adjusted to lock and unlock the pan axle 184, thereby enabling a user to rotate the firearm about the first axis 182. At block 708 of the method 700, the firearm may be rotated about a second axis 208 using the cant mechanism 206. For example, the cant lever 216 may be adjusted to lock and unlock the cant axle 210, thereby enabling a user to rotate the firearm about the second axis 208. The operations described in blocks 702-708 of the method 700 may be performed in any order. Moreover, certain operations may be omitted, while other operations may be added.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or operations. Thus, such conditional language is not generally intended to imply that features, elements, and/or operations are in any way required for one or more embodiments.

That which is claimed is:

1. A firearm support, comprising:
    a main body assembly;
    at least two legs operably attached to the main body assembly, wherein the at least two legs are each operably attached to the main body assembly by a leg adapter and an indexer assembly configured to control an angular rotation of the at least two legs about the main body assembly, wherein each indexer assembly comprises:
        a first circumferential array of indexes disposed about the main body assembly;
        a second circumferential array of indexes operably attached to one of the at least two legs by the adapter; and
        an indexer spring positioned between the first circumferential array of indexes and the leg adapter parallel to an axis of rotation of the one of the at least two legs so as to bias the indexer assembly in a locked configuration; and
    a mounting assembly operably attached to the main body assembly, wherein the mounting assembly comprises:
        an attachment mechanism operable to attach a firearm to the mounting assembly;
        a pan mechanism operable to control an angular rotation about a first axis of the mounting assembly; and
        a cant mechanism operable to control an angular rotation about a second axis of the mounting assembly.

2. The firearm support of claim 1, wherein the pan mechanism comprises:
    a pan axle rotatably coupled to the main body assembly;
    a pan friction lock at least partially disposed about the pan axle and comprising a pan locked position and a pan unlocked position; and
    a pan lever operable to move the pan friction lock between the pan locked position and the pan unlocked position.

3. The firearm support of claim 2, wherein the pan mechanism comprises a pan friction lock housing having a pan axle aperture therethrough, wherein the pan axle is at least partially disposed within the pan axle aperture, and wherein the pan friction lock is at least partially disposed within the pan friction lock housing.

4. The firearm support of claim 2, wherein the pan mechanism comprises a pan limiter assembly configured to limit the angular rotation of the pan axle about the first axis.

5. The firearm support of claim 4, wherein the pan limiter assembly comprises:
a pan limiter plate attached to the pan axle; and
at least one pan limiter catch attached to the main body assembly.

6. The firearm support of claim 2, wherein the cant mechanism comprises:
a cant axle rotatably coupled to the pan axle;
a cant friction lock at least partially disposed about the cant axle and comprising a cant locked position and a cant unlocked position; and
a cant lever operable to move the cant friction lock between the cant locked position and the cant unlocked position.

7. The firearm support of claim 6, wherein the cant mechanism comprises a cant friction lock housing having a cant axle aperture therethrough, wherein the cant axle is at least partially disposed within the cant axle aperture, and wherein the cant friction lock is at least partially disposed within the cant friction lock housing.

8. The firearm support of claim 1, wherein
the indexer spring comprising a first position and a second position, wherein the first circumferential array of indexes and the second circumferential array of indexes are operable to mate in the locked configuration when the indexer spring is in the first position, and wherein the first circumferential array of indexes and the second circumferential array of indexes are operable to rotate about each other when the indexer spring is in the second position.

9. The firearm support of claim 1, wherein the at least two legs each comprise a telescoping assembly operable to extend and retract the at least two legs.

10. The firearm support of claim 9, wherein each telescoping assembly comprises:
an outer leg comprising a slot;
an inner leg at least partially disposed within the outer leg and operable to extend and retract relative to the outer leg;
a telescoping spring disposed within the outer leg and comprising a first position and a second position;
a latch operably attached to the outer leg and comprising a locked position and an unlocked position; and
a plurality of notches disposed about the inner leg, wherein the latch is operable to at least partially extend within the slot to mate with at least one of the plurality of notches when in the locked position.

11. The firearm support of claim 10, wherein each telescoping assembly comprises:
a catch channel disposed on the inner leg; and
a catch screw extending through the outer leg and operable to engage the catch channel.

12. The firearm support of claim 10, wherein the at least two legs each comprise a support foot attached to the inner leg.

13. The firearm support of claim 1, wherein the attachment mechanism comprises:
a clamp assembly comprising a clamped position and an unclamped position; and
an attachment lever assembly operable to move the clamp assembly between the clamped position and the unclamped position by way of a cam-type mechanism.

14. The firearm support of claim 13, wherein the clamp assembly further comprises:
a fixed clamp;
a moveable clamp operable to move relative to the fixed clamp between the clamped position and the unclamped position;
an attachment lever disposed opposite the moveable clamp; and
at least one coupling rod that couples the attachment lever and the moveable clamp, wherein movement of the attachment lever moves the moveable clamp.

15. The firearm support of claim 14, wherein a clamping force of the clamp assembly is adjusted by increasing or decreasing a distance between the fixed clamp and the moveable clamp along the at least one coupling rod.

16. The firearm support of claim 15, wherein the at least one coupling rod is configured to at least partially protrude between at least two mounting projections on a rail assembly of the firearm.

17. The firearm support of claim 13, wherein the clamp assembly at least partially comprises a silhouette that corresponds to a profile of a rail assembly of the firearm.

18. A firearm support, comprising:
a main body assembly;
two legs each rotatably attached to the main body assembly by a leg adapter and an indexer assembly configured to control an angular rotation of the two legs about the main body assembly, wherein the two legs each comprise a telescoping assembly operable to extend and retract the two legs, wherein each indexer assembly comprises:
a first circumferential array of indexes disposed about the main body assembly;
a second circumferential array of indexes operably attached to one of the two legs by the leg adapter; and
an indexer spring positioned between the first circumferential array of indexes and the leg adapter parallel to an axis of rotation of the one of the two legs so as to bias the indexer assembly in a locked configuration; and
a mounting assembly operably attached to the main body assembly, wherein the mounting assembly comprises:
an attachment mechanism operable to attach a firearm to the mounting assembly;
a pan mechanism operable to control an angular rotation about a first axis of the mounting assembly; and
a cant mechanism operable to control an angular rotation about a second axis of the mounting assembly.

19. A method for supporting a firearm, comprising:
providing a main body assembly;
attaching two legs to the main body assembly each by a leg adapter and an indexer assembly configured to control an angular rotation of the two legs about the main body assembly, wherein the two legs each comprise a telescoping assembly operable to extend and retract the two legs, wherein each indexer assembly comprises:
a first circumferential array of indexes disposed about the main body assembly;
a second circumferential array of indexes operably attached to one of the two legs by the leg adapter; and
an indexer spring positioned between the first circumferential array of indexes and the leg adapter parallel to an axis of rotation of the one of the two legs so as to bias the indexer assembly in a locked configuration; and attaching a mounting assembly to the main body assembly, wherein the mounting assembly comprises:
 an attachment mechanism operable to attach a firearm to the mounting assembly;
 a pan mechanism operable to control an angular rotation about a first axis of the mounting assembly; and
 a cant mechanism operable to control an angular rotation about a second axis of the mounting assembly.

\* \* \* \* \*